US012735920B2

(12) United States Patent
Pettengill

(10) Patent No.: US 12,735,920 B2
(45) Date of Patent: Sep. 15, 2026

(54) LOCK FOR A MOTOR VEHICLE, IN PARTICULAR HOOD OR HINGED-PANEL LOCK

(71) Applicant: Kiekert AG, Heiligenhaus (DE)

(72) Inventor: Robert S. Pettengill, Farmington, MI (US)

(73) Assignee: Kiekert AG, Heiligenhaus (DE)

( * ) Notice: Subject to any disclaimer, the term of this patent is extended or adjusted under 35 U.S.C. 154(b) by 129 days.

(21) Appl. No.: 18/466,087

(22) Filed: Sep. 13, 2023

(65) Prior Publication Data

US 2025/0084675 A1 Mar. 13, 2025

(51) Int. Cl.
*E05B 83/24* (2014.01)
*E05B 81/14* (2014.01)
(Continued)

(52) U.S. Cl.
CPC ............ *E05B 83/243* (2013.01); *E05B 81/14* (2013.01); *E05B 81/20* (2013.01); *E05B 81/66* (2013.01); *E05B 81/68* (2013.01); *E05B 83/24* (2013.01)

(58) Field of Classification Search
CPC ........ E05B 83/16; E05B 83/24; E05B 83/243; E05B 83/247; E05B 81/14; E05B 81/15;
(Continued)

(56) References Cited

U.S. PATENT DOCUMENTS 5,150,933 A * 9/1992 Myslicki ................. E05B 83/16 292/216
5,785,364 A * 7/1998 Kleefeldt ................ E05B 81/64 292/201
(Continued)

FOREIGN PATENT DOCUMENTS

CN 111809988 A * 10/2020 ............. E05B 81/04
CN 115434584 A * 12/2022 ............. E05B 81/64
(Continued)

OTHER PUBLICATIONS

Computer Generated Translation for KR 20170119013 A, Generated on Apr. 4, 2025, https://worldwide.espacenet.com/ (Year: 2025).*
(Continued)

*Primary Examiner* — Alyson M Merlino
(74) *Attorney, Agent, or Firm* — Renner, Otto, Boisselle & Sklar, LLP

(57) ABSTRACT

A hood lock for a motor vehicle comprising a locking mechanism with a rotary latch and at least one pawl, a lock holder interacting with the locking mechanism, a release lever, the locked locking mechanism being able to be unlocked by means of the release lever, and the lock holder being transferable from a latching position into a support position after a first actuation, and the lock holder being transferable after a second actuation of the release lever into a release position, and a closing drive, wherein the locking mechanism can be moved by means of the closing drive from the support position into a main latching position, and wherein at least one position of the rotary latch can be detected by means of a switching means, and wherein at least one further switching means is provided for detecting the pawl position.

15 Claims, 2 Drawing Sheets

(51) Int. Cl.
*E05B 81/20* (2014.01)
*E05B 81/66* (2014.01)
*E05B 81/68* (2014.01)

(58) Field of Classification Search
CPC .......... E05B 81/20; E05B 81/64; E05B 81/66; E05B 81/68
See application file for complete search history.

(56) References Cited

U.S. PATENT DOCUMENTS

| | | | | | |
|---|---|---|---|---|---|
| 5,938,252 | A * | 8/1999 | Uemura | E05B 81/64 | 292/216 |
| 6,048,003 | A * | 4/2000 | Shimura | E05B 81/66 | 292/201 |
| 8,608,212 | B2 * | 12/2013 | Takeda | E05B 81/64 | 292/216 |
| 9,428,935 | B2 * | 8/2016 | Yamashita | E05B 81/66 | |
| 10,584,520 | B2 * | 3/2020 | Scholz | E05B 83/24 | |
| 10,669,751 | B2 * | 6/2020 | Kim | E05B 83/24 | |
| 10,697,209 | B2 * | 6/2020 | Kim | E05B 83/24 | |
| 10,890,018 | B2 * | 1/2021 | Distefano | E05B 83/24 | |
| 11,015,375 | B2 * | 5/2021 | Lebsak | E05B 83/24 | |
| 11,414,904 | B2 * | 8/2022 | Klein | E05B 83/24 | |
| 11,428,032 | B2 * | 8/2022 | Sturm | E05B 83/24 | |
| 11,441,337 | B2 * | 9/2022 | Ney | E05B 81/66 | |
| 11,512,504 | B2 * | 11/2022 | Lebsak | E05B 83/24 | |
| 11,933,082 | B2 * | 3/2024 | Strole | E05B 83/24 | |
| 2010/0194120 | A1 * | 8/2010 | Kaiser | E05B 81/68 | 292/198 |
| 2017/0268265 | A1 * | 9/2017 | Hiramoto | E05B 83/40 | |
| 2021/0010304 | A1 * | 1/2021 | Rosales | E05B 81/66 | |
| 2022/0106817 | A1 * | 4/2022 | Holbein | E05B 83/24 | |
| 2024/0337139 | A1 * | 10/2024 | Suk | E05B 83/24 | |

FOREIGN PATENT DOCUMENTS

| | | | | | |
|---|---|---|---|---|---|
| CN | 116517409 | A | * | 8/2023 | E05B 79/20 |
| CN | 116696158 | A | * | 9/2023 | |
| DE | 29600386 | U1 | | 6/1997 | |
| DE | 19643482 | A1 | * | 11/1997 | E05B 81/20 |
| DE | 102010061518 | A1 | | 4/2012 | |
| DE | 102019110702 | A1 | * | 10/2020 | E05B 81/66 |
| DE | 102020115879 | A1 | * | 12/2021 | |
| DE | 102021119635 | A1 | | 2/2023 | |
| EP | 2155994 | B1 | | 2/2010 | |
| EP | 2434077 | A1 | * | 3/2012 | E05B 81/14 |
| KR | 20170119013 | A | * | 10/2017 | |
| KR | 2019063319 | A | * | 6/2019 | |
| WO | 2015096830 | A1 | | 7/2015 | |
| WO | WO-2019038233 | A1 | * | 2/2019 | |
| WO | 2022167556 | A2 | | 8/2022 | |

OTHER PUBLICATIONS

Computer Generated Translation for DE 19643482, Generated on Oct. 14, 2025, https://worldwide.espacenet.com/patent/ (Year: 2025).*
International Search Report and Written Opinion mailed Jan. 3, 2025, for International Application No. PCT/US2024/044986.

* cited by examiner

LOCK FOR A MOTOR VEHICLE, IN PARTICULAR HOOD OR HINGED-PANEL LOCK

FIELD OF DISCLOSURE

The invention relates to a hood or hinged-panel lock for a motor vehicle, comprising a locking mechanism having a rotary latch and at least one pawl, a lock holder interacting with the locking mechanism, a release lever, the locked locking mechanism being able to be unlocked by means of the release lever, and the lock holder being able to be transferred after a first actuation from a latching position into a support position, and the lock holder being able to be moved into a release position after a second actuation of the release lever, and a closing drive, the locking mechanism being able to be moved by means of the closing drive from the support position into the main latching position, and at least one position of the rotary latch being detectable by means of a switching means.

BACKGROUND OF DISCLOSURE

Locks or locking systems for motor vehicles are used where doors, hinged panels or movable components must be held on motor vehicles in order to ensure safe driving of the motor vehicle. Even if the locking systems serve primarily to hold the movable components in their closed position, today there is an increasing emphasis on comfort functions. In this case it is preferably important, in the case of hinged panels, that secure closing and easy opening are ensured.

In this case, engine hoods or hinged panels can be closable by means of a seal, such that a tightness is provided, for example, against water or dirt. In this case, a seal means that, when the lock is being closed, a counter-pressure opposes the locking mechanism as a securing element.

Preferably and generally usual, is that in the case of engine hoods or hinged panels a lock holder is fastened to the engine hood or to the hinged panel, which lock holder then interacts with the motor vehicle lock. The lock holder generally interacts with a locking mechanism of the associated motor vehicle door lock. The lock holder and motor vehicle door lock generally define the motor vehicle door locking means. In conjunction with the locking mechanism in the motor vehicle lock, the lock holder ensures a secure and reliable closure. In principle, this can also be reversed.

Due to the primary closing function of the lock holder in conjunction with the locking mechanism in the motor vehicle lock, this is, on the one hand, a particularly safety-relevant component which, on the other hand, is exposed to particular loads in particular in the event of an accident. In fact, the protection of vehicle occupants in the event of an accident depends substantially on how reliably the lock holder and the locking mechanism interacting therewith are capable of absorbing the forces acting thereon. This is because it is of primary importance in this case that the components arranged movably on the motor vehicle remain closed, or the hood or hinged panel remains closed, such that safety devices provided in or on the motor vehicle, such as a brake assistant, side airbag, side impact protection, etc., can deploy their desired effect.

The locking mechanism contained in the motor vehicle lock has a pre-latching or holding, support or catch position, and a main latching position. In the case of hood or hinged-panel locks, two-stroke actuation is provided. By means of a first stroke, which acts on the motor vehicle lock for example via a Bowden cable or by means of an electromotive drive, the lock holder is transferred from the main latching position (closed hinged panel) into a pre-latching, support or catch position. This secures the hinged panel against opening completely, and thus endangering the driver or passengers, in the event of inadvertent actuation of the Bowden cable. The hinged panel or hood is completely released only after a second pull on the Bowden cable or an electrical actuation of the drive or of a lever that is to be actuated manually.

A front hinged-panel lock of the type described above is described in DE 296 00 386 U1. The front hinged-panel lock interacts with a closing bar. The front hinged-panel lock is usually arranged on the front end of a motor vehicle and interacts with a closing bar of a front hinged panel. The closing bar is pivotably mounted on the front hinged panel and can be pivoted from a normal position into an avoiding position, counter to the restoring force of a closing bar spring. This is achieved with the aid of an actuating handle which can be actuated by the user when the closing bar is in a pre-latching position. The closing bar is then pivoted out of its movement path and can pivot around the hook end. During closing of the closure, the closing bar, and in particular a rib that forms the end of the closing bar, slides along on the control flank of the catch hook, which, in the prior art, is fixedly connected to the lock housing. The catch hook runs over the end of the control flank and is then moved back by the tensioned catch hook spring, such that it assumes a rear engagement position relative to the latching flank. When the closing bar is displaced further, it enters a locking mouth of a rotary latch, which twists in the course of the further displacement of the closing bar and is secured by a pawl in a locking position.

A front hinged-panel lock is known from DE 10 2010 061 518 A1, comprising a catch hook assigned to a lock housing for catching a closing bar, the catch hook comprising a control flank and a latching flank which lies in the movement path of the closing bar which can be diverted out of its movement path in such a way that, when the front hinged panel is closed, said closing bar initially slides along on the control slope of the catch hook which is fixed relative to the lock housing in the catching position and after passing the catch hook end enters a pre-latching position behind the latching flank, and is held in a locking position of the rotary latch by a locking mouth of a pawl, into which the closing bar enters in an open position of the rotary latch after a further displacement of the front hinged panel in the closing direction, the catch hook being fixedly connected to the rotary latch and the rotary latch being pivot-blocked by a spring-loaded ejection arm into its open position, which pivot-blocking is removed by displacement of the ejection arm upon entry of the closing bar into the locking mouth.

In order to be able to carry out a transfer of the lock from a support position into the main latching position in a manner assisted by an electric motor, for example in order to increase the operating comfort in the motor vehicle, it is known from the unpublished DE 10 2021 119 635 A1 to transfer the hood lock from the support position into the main latching position by means of a closing drive. In this case, in order to control the closing drive, the position of the rotary latch can be detected using a switching means.

SUMMARY OF DISCLOSURE

The object of the invention is that of improving the front hinged-panel lock mentioned at the outset, in terms of control technology. Furthermore, it is an object of the invention to design the lock in a structurally simpler and more cost-effective manner as a whole.

It should be noted that the embodiments described below are not restrictive; rather, any variation of the features described in the description and the dependent claims is possible.

According to one aspect, the object of the invention is achieved in that a hood lock for a motor vehicle is provided, comprising a locking mechanism having a rotary latch and at least one pawl, a lock holder interacting with the locking mechanism, a release lever, the locked locking mechanism being able to be unlocked by means of the release lever, and the lock holder being able to be transferred, after a first actuation, from a latching position into a support position, and the lock holder being able to be moved into a release position after a second actuation of the release lever, and a closing drive, the locking mechanism being able to be moved by means of the closing drive from the support position into the main latching position, and at least one position of the rotary latch being detectable by means of a switching means, and at least one further switching means being provided for detecting a pawl position. As a result of the design of the lock according to the invention, it is now possible to provide a lock, in particular a hood lock, for a motor vehicle, in which a transfer of the rotary latch from the support position into the main latching position, which is optimized in terms of control technology, is made possible. In particular, the detection of the position of the rotary latch in combination with the detection of the position of the pawl can be used to enable a secure transfer of the hood into the closed position, i.e. the main latching position. In this case, detecting the position of the pawl makes it possible for the closing operation to be initiated in a manner in which it is controlled in a targeted and defined manner. The closing operation can be initiated only when the pawl has reliably detected the rotary latch in the support position, i.e. the pre-latching position. Consequently, a further securing can be provided for the defined closing. This is advantageous in particular because the closing and the transfer of the hood into the completely closed position is carried out in a manner assisted by an electric motor. If, at the time when the support position is reached, i.e. the pre-latching position, the pawl has not present completely entered into the rotary latch, it is thus possible to recognize, for example, that the hood cannot yet be closed using the electric motor. This is advantageous since, for example, an object may be located between the hood and the bodywork, which prevents the support position from being reached completely. A securing means for controlling the closing can thus be provided by the further switching means.

As already stated above, the invention does not relate solely to a hood lock, but can also be used in particular in the case of hinged panels or components arranged movably, in a comparable manner, on the motor vehicle. Preferably, however, the invention relates to a hood lock for a motor vehicle. Hood locks are referred to in particular when the hood is located in the front region of the motor vehicle. The hood can thus also be referred to as an engine hood. However, it is also conceivable that a trunk is located under the hood or hinged panel, or that electric motors or an electric motor-driven controller for the motor vehicle are located there. In this case, the hood can be provided with a peripheral seal in order, for example, to protect luggage items from the ingress of moisture. The hood must then be pulled closed against this seal, the hood being transferred from the support position into the main latching position or closed position. To this end, the closing drive must overcome the resistance of the seal, such that it is necessary to work with strong forces in the lock, in order to enable secure closing and reaching of the main latching position.

Locking mechanisms in motor vehicle locks are generally known and consist of a rotary latch and at least one pawl. In the claimed motor vehicle lock, a rotary latch is provided which holds the lock holder in a closed main latching position and at the same time enables a support position to be assumed in which the hood is held in a partially open state. This is important in particular since, in the case of an engine hood and unintentional opening of the engine hood, the engine hood must be held in the support position. Complete opening in the case of a one-time actuation of the locking mechanism would involve the risk that the engine hood is completely opened immediately, which could lead to accidents in the event of unintentional opening during travel. Consequently, a two-step opening is provided in the claimed hood lock. In other words, the locking mechanism is unlocked twice. First, the main latching position is unlocked and the rotary latch is transferred into a support position or pre-latching position, in which the pawl enters the rotary latch again and secures the rotary latch. Only after a second unlocking process, i.e. a movement of the pawl, is the rotary latch released or the lock holder released, such that an open position of the rotary latch is present. The engine hood can then be opened manually and/or in a spring-assisted manner.

When the open engine hood is being closed, the engine hood is caught by the rotary latch, or rather the lock holder comes into engagement with the rotary latch and due to the weight of the engine hood the rotary latch reaches the support position or the pre-latching position of the locking mechanism. In the support position, the pawl secures the rotary latch, such that the hood is securely held. The rotary latch is monitored by means of a microswitch or a switching means, such that a support position and/or a main latching position can be detected. According to the invention, the locking mechanism has a further switching means by which the position of the pawl can be detected. Only after the pawl has completely entered the pre-latching position is it possible to determine with high certainty that the locking mechanism is in the support position or pre-latching position. The closing drive can now transfer the rotary latch from the pre-latching position into the main latching position. A transfer of the hood into the main latching position, that is to say the closed position, said transfer being secure in terms of control technology, can thus take place.

In a continuation of the invention, a two-armed pawl is provided, a main latching position being able to be achieved by means of a first arm, and a pre-latching position in the locking mechanism being able to be achieved by means of a second arm. The two-armed design of the pawl is achieved in that the pawl is mounted approximately centrally, such that a pivoting movement in different directions allows for latching of the pawl into the rotary latch. In this case a first arm engages with a first latching contour into the main latch of the rotary latch, the pawl passing directly into the movement range of the rotary latch, after unlocking of the locking mechanism, that is to say a movement of the pawl out of the latching position of the rotary latch, such that a secure engagement of the pre-latching position can be ensured. The unlocking of the locking mechanism from the main latching position consequently directly causes the pawl to latch into a second latching contour on the rotary latch. If the pawl is then released by the release lever, the pawl again enters the engagement region with the rotary latch, in a spring-preloaded manner. There, the pawl latches again into a pre-latching contour of the rotary latch and thus secures the pre-latching position or support position of the hood or hinged panel. In the support position, the lock holder is still in engagement with the rotary latch, such that an unintentional complete opening of the hood can be prevented. In this case, by moving the pawl back and forth, secure locking of the locking mechanism is made possible. Only after a second actuation of the pawl by a release lever is the rotary latch released completely, such that the rotary latch enters into an open position and the lock holder is released.

In a further variant of the invention, the pawl can be electrically actuatable, in particular electrically actuatable by means of a release lever. In order to increase the comfort of the motor vehicle, the hood can be opened in an electrically actuated manner. For this purpose, further safety features are possible—for example, in order to completely open the hood the electric drive must be actuated twice in order, for one thing, to transfer the hood from the main latching position into the pre-latching position and, moreover, to transfer the engine hood from the pre-latching or support position into the release position. An electrical actuation of the release lever in this case enables a comfortable opening without manual intervention in the lock, and for example release of a catch hook, being necessary. In this case, the release lever can be moved by means of an electric motor and a corresponding mechanism. Preferably, a release lever operates the pawl, such that for example the release lever is movable or pivotable.

It can be advantageous here, and may constitute a further design variant of the invention, if a pawl position can be indirectly determined or detected via the release lever. The release lever is preferably arranged pivotably in the motor vehicle lock and is moved pivotably via a release drive, preferably a linear link. When the release lever is moved, the pawl is moved and unlocking of the locking mechanism can take place. For reliable detection of the pre-latching position, a switching means is provided which can be brought into engagement with the release lever in such a way that the switching means is actuated only when the pawl is completely engaged in the pre-latching position. In other words, the support position or pre-latching position is detected by means of the pawl switch. For this purpose, the release lever can have, for example, a control contour which can be brought into engagement with the switching means, preferably a microswitch.

If a rotary latch position is detectable by means of a transmission lever, a further design variant of the invention again results. A transmission lever can be arranged in the motor vehicle lock in such a way that the transmission lever is in contact with the rotary latch. In particular in the main latching position, the transmission lever rests on the rotary latch in a spring-preloaded manner and holds its rest position. Only when the rotary latch is released from the pre-latching position into the open position of the rotary latch does the transmission lever reach a position in which the transmission lever engages with the pawl. The rotary latch thus controls the position of the transmission lever, thereby enabling positioning of the pawl in the release position. In other words, the transmission lever then holds the pawl out of engagement when the rotary latch has reached its open position. In the open position, the pawl is thus not able to engage in the rotary latch. The engine hood can be lifted and opened in the open position of the rotary latch. The transmission lever thus serves to secure the release position of the pawl during opening of the hood or hinged panel. For this purpose, the transmission lever is arranged pivotably and in a spring-preloaded manner in the motor vehicle lock, and preferably rests on an outer surface of the rotary latch. The transmission lever can thus also be referred to as a safety lever for positioning the pawl.

In a further design variant of the invention, a rotary latch position can be detected by means of a control lever. In other words, the switching means does not rest directly on the rotary latch, but rather a control lever is provided which engages with the rotary latch and which is movable via the rotary latch. The control lever thus assumes the function of detecting the rotary latch position and can thus serve to control the closing drive. Consequently, a very precise determination of the position of the hood lock can be detected, as a result of which in turn a secure opening and closing or pulling-to of the hood lock is made possible.

It can also be advantageous if the control lever can be brought into engagement with a contour, in particular a bolt, on the rotary latch. The control lever is provided in the motor vehicle lock in a spring-preloaded manner and is accommodated in the motor vehicle lock in a manner preloaded in the direction of the rotary latch. Preferably, the control lever moves about a pivot axis, i.e. the control lever is pivotably received in the motor vehicle lock. In this case, the control lever rests against a contour of the rotary latch, such that a reliable detection and in particular a direct detection of the position of the rotary latch can be made possible. The contour can be formed, for example, by a cladding, in particular a plastic cladding, on the rotary latch or, as described in the further embodiment, can be formed by a bolt arranged on the rotary latch. The contour or the bolt moves the control lever and is thus directly engaged with the control lever, such that a reliable detection of the rotary latch position can be made possible.

If the control lever can be brought into engagement with a switching means, preferably with two switching means, a further design variant of the invention results. The control lever interacts with the switching means such that the control lever works by the movement of the rotary latch, and the control lever actuates the switching means. In this case, the switching means can be a microswitch, but can also be designed, for example, as a contactless sensor, for example a Hall sensor. The switching means is preferably a microswitch. In this case, the control lever interacts with the switching means in such a way that either a contour formed on the control lever comes into engagement with the switching means or for example a magnet is provided on the control lever which interacts with a contactless sensor. If two switching means are arranged in the motor vehicle, which can be brought into engagement with the control lever, a targeted and defined control of the closing drive can take place. In a main latching position of the rotary latch, both switching means are released, i.e. the switching means are present non-actuated and are released by the control lever. When the pre-latching position is reached, a first switching means is actuated such that a closing operation can be initiated. When the rotary latch is completely released by the pawl, that is to say when the open position of the rotary latch is reached, the second switching means will also be actuated, such that a clear signal is available for the controller, indicating that the hood is in the open position. The combination of the two switching means makes it possible to unambiguously deduce the position of the rotary latch, such that a pre-latching position or support position and a main latching position of the rotary latch can be reliably detected.

In an advantageous development of the invention, the contour on the rotary latch can be brought into engagement with a closing lever. The contour or the bolt on the rotary latch thus has a dual function. For one thing, the contour or the bolt controls the control lever, and at the same time the bolt or the contour can be used as an engagement means for the closing drive. For this purpose, the closing lever engages directly on the contour or the bolt and moves the rotary latch from the pre-latching position or the support position into the main latching position or closed position of the rotary latch.

A further variant of the invention results when the closing lever can be guided in a reinforcement plate of the motor vehicle lock. The motor vehicle lock has a lock case, the lock case carries at least the shafts of the locking mechanism components. In the event of an extreme load, as occurs, for example, in the case of an accident, the locking mechanism must be capable of absorbing the high forces. For this purpose, the lock plate or lock case is made of a steel sheet and the shafts of the locking mechanism components as well as the locking mechanism components themselves are made of metal or a steel. The reinforcement plate can support the locking mechanism components and/or the closing drive and/or a positioner lever, or attach them to the shafts mentioned. In other words, the reinforcement plate serves to reinforce the motor vehicle lock and serves as a support for the movable components in the motor vehicle lock. In an advantageous manner, the reinforcement plate serves as an additional support and reinforcement in the motor vehicle lock, and at the same time serves as a guide for the closing lever. As described in the introduction, the closing lever must sometimes transmit high forces, namely when the engine hood has to be closed against a peripheral seal. In particular, it is important that a secure engagement between the closing lever and the rotary latch can be ensured. The guide in the reinforcement plate serves as a guide contour for the closing lever. The guide in the reinforcement plate can be provided, for example, by a bolt on the closing lever, the bolt being able to be guided in a recess in the reinforcement plate. Of course, a reverse design is also possible, that, for example, a bolt is provided on the reinforcing plate, the bolt serving as a guide means for the closing lever.

It can also be advantageous if the release lever and the control lever are accommodated pivotably on an electrical component carrier. The release lever and the control lever are both components that transmit only small forces. Preferably, the release lever and the control lever are made of a plastic. The two levers, release lever and control lever, interact, by means of their control contours, with the switching means, the switching means preferably being accommodated and held directly on an electrical component carrier. This reduces the number of components required and simplifies the design of the motor vehicle lock overall. If bearing points for the release lever and the control lever are now provided simultaneously by the electrical component carrier, the structural design can be further simplified and the lock can thus be designed more cost-effectively overall. Of course, it is also conceivable that only one lever is mounted on the electrical component carrier, and a second lever is accommodated in the motor vehicle lock housing. However, in this case the accommodation of the microswitches and the levers makes possible an advantageous design variant which enables the number of components required for the reliable design, in terms of control technology, of the motor vehicle lock.

BRIEF DESCRIPTION OF DRAWINGS

The invention is explained in more detail below with reference to the accompanying drawings on the basis of a preferred exemplary embodiment. However, the principle applies that the exemplary embodiment does not limit the invention, but merely represents one embodiment. The features shown can be implemented individually or in combination with further features of the description as well as the claims-individually or in combination.

In the figures.

DETAILED DESCRIPTION

Figure 1:
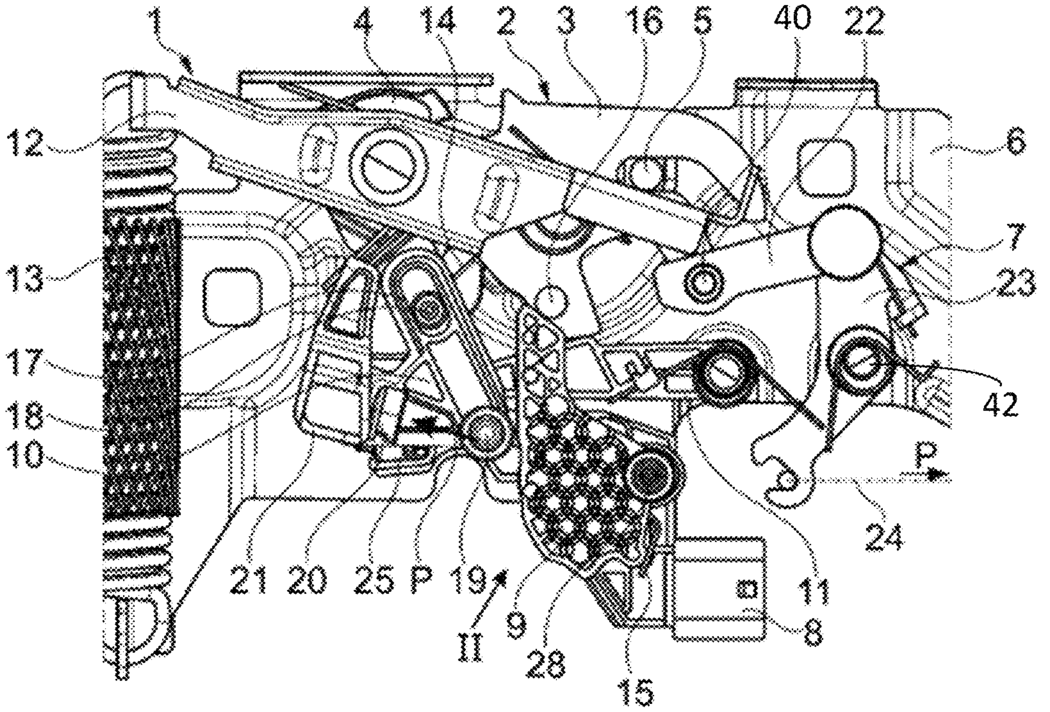
FIG. 1 is a side view of a hood lock designed according to the invention, in a main latching position.

FIG. 1 shows a motor vehicle lock 1 in a plan view of a locking mechanism 2 comprising a rotary latch 3 and a pawl 4. The hood lock 1 is shown in a main latching position in which a lock holder 5 is held by means of the rotary latch 3, such that in principle a closed hood would be present. The main lock further comprises a lock case 6, a closing drive 7, an electrical component carrier 8, a control lever 9, a release lever 10, a transmission lever 11, a positioner 12 and a spring element 13.

The hood lock 1 is shown in a main latching position, the pawl 4 resting against a main latch 14 of the rotary latch 3 or the pawl 4 being in engagement with the rotary latch 3. In this main latching position, the control lever 9 is preloaded counter to a contour 16 on the rotary latch 3 by means of a spring element 15. In this embodiment, the contour 16 is takes the form of a bolt on the rotary latch 3. The release lever 10 interacts with the rotary latch 4, and in particular a guide bolt 18, with the pawl 4 via a guide 17. The release lever 10 is in turn accommodated pivotably via a shaft 19 in the electrical component carrier 8 and can be moved in the counterclockwise direction in a manner driven by an electric motor. In order to move the release lever 10, a drive element 20 engages on an extension 21 of the pawl 4 and moves the release lever 10 in the counterclockwise direction. The drive element 20 can be moved, for example, via a linear motor, such that a pivoting movement can be introduced into the pawl.

The positioner 12 rests on the lock holder 5 in a manner spring-preloaded by the tension spring 13, such that a force acts on the lock holder 5 in the opening direction of the rotary latch. For this purpose, the spring 13 is preferably takes the form of a tension coil spring. The spring 13 is fastened at one end to the lock case 6 and, at the opposite end, the coil spring engages in the positioner.

The closing drive 7 is shown in the non-actuated state, i.e. a closing lever 22 is disengaged from the contour 16. In order to guide the closing lever 22, a guide bolt 40 can be guided in a reinforcement plate (not shown). The closing drive 7 further comprises a drive lever 23, the drive lever 23 being accommodated pivotably in the lock case via a shaft 42. The closing lever 22 can be actuated by means of an electromotive drive and in particular an electric motor-actuated Bowden cable 24. For this purpose, the Bowden cable moves in the direction of the arrow P and pivots the drive lever 23 such that the closing lever 22 can engage with the bolt 16 on the rotary latch 3.

For further explanation of the control-related design of the hood lock 1, the hood lock 1 has three microswitches 25, 26, 27. In the main latching position shown, all the microswitches 25, 26, 27 are unactuated, as a result of which a clear position of the pawl 4 and of the rotary latch 3 can be detected. In order to actuate the microswitches 25, 26, 27, the release lever 10 and the control lever 9 can be pivoted about the shaft 19, 28, the release lever 10 preferably being moved via the guide bolt 18, whereas the control lever 9 follows the movement of the rotary latch 3 via the leg spring 15.

Figure 2:
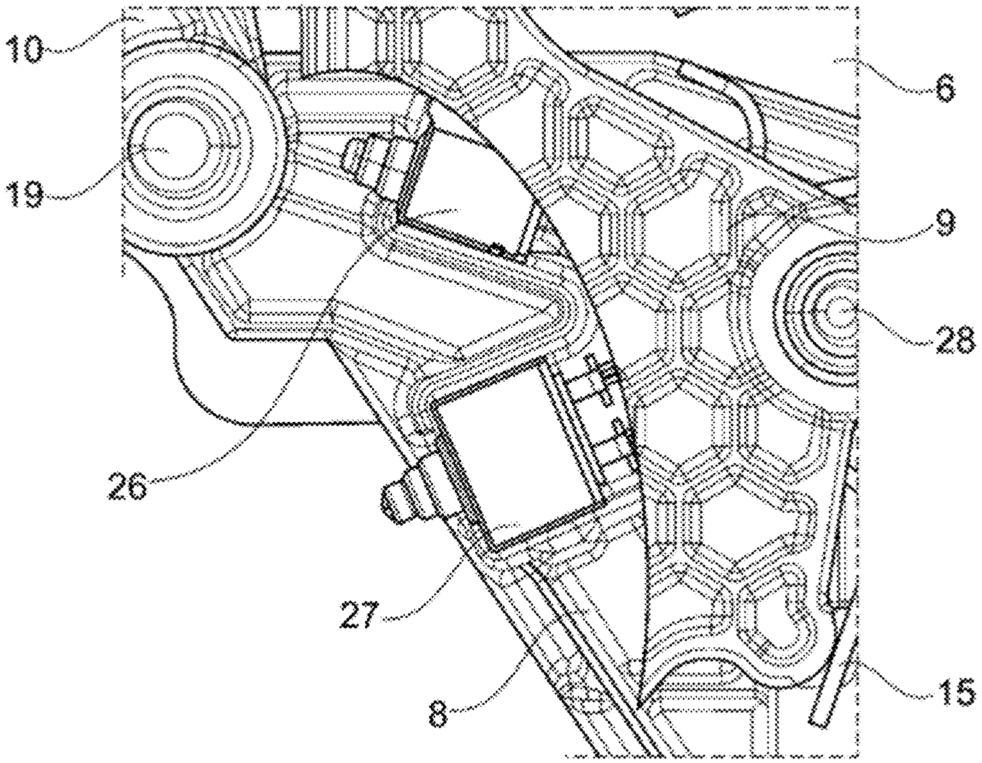
FIG. 2 is a detail view according to arrow II from FIG. 1, the control lever being shown as a sectional view.

FIG. 2 shows a part of the electrical component carrier 8, the control lever 9 being shown cut away in regions, such that the position of the microswitches 26, 27 below the control lever 9 can be seen. Both microswitches are present unactuated, as also shown in FIG. 1.

Figure 3:
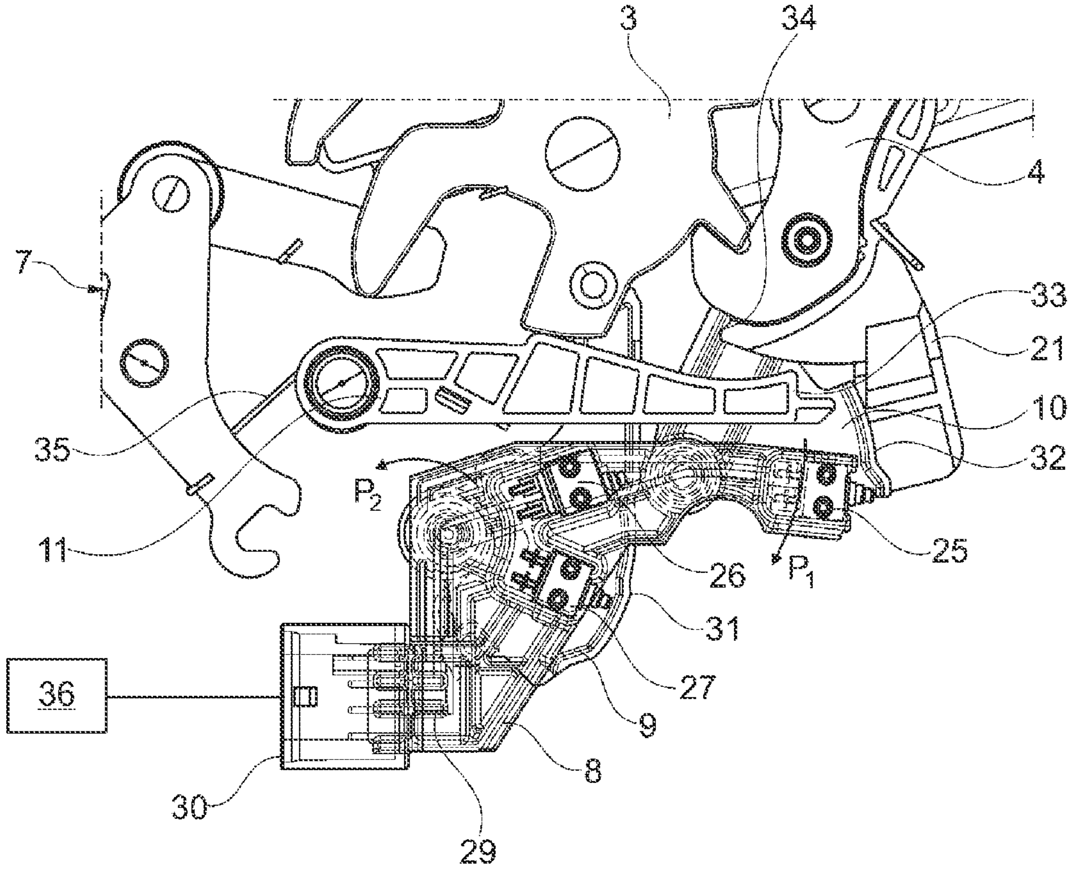
FIG. 3 is a view of a rear side of the hood lock according to FIG. 1, in a view of the electrical component carrier.

FIG. 3 now shows a rear view of the hood lock 1 from the perspective of the electrical component carrier 8 and without the lock case 6. The electrical component carrier 8 comprises conductor tracks 29 and a plug 30. The electrical component carrier 8 is shown transparently, such that the microswitches 25, 26, 27 can be seen and the interaction between microswitches 25, 26, 27 and the control lever 9 and the release lever 10 can be explained. A control contour 31, 32 is shown in each case on the control lever 9 and on the release lever 10. A control contour 32 is arranged on the release lever 10, such that a movement of the release lever 10 in the direction of the arrow P1 leads to an actuation of the microswitch 25. If the plastic-like extension 21 on the metal pawl 4 is actuated, the release lever 10 pivots in the direction of the arrow P1 and the control contour 32 comes into engagement with the microswitch 25. The control contour 32 then actuates the microswitch, such that a clear signal relating to the position of the pawl 4 can be detected. If the rotary latch 3 is released by the pawl 4, the control lever 9 likewise moves, specifically in the direction of the arrow P2, in the counterclockwise direction. The movement of the control lever 9 in the direction of the arrow P2 first causes the microswitch 26 to be actuated, specifically by means of the control contour 31, such that the support position or the pre-latching position of the rotary latch 3 can be identified or detected.

If the pawl 4 is now actuated a second time, the rotary latch reaches the open position from the pre-latching position or the support position, and the control lever follows the movement of the rotary latch. The control lever is moved further in the direction of the arrow P2, such that the microswitch 27 also comes into engagement with the control contour 31. The second microswitch 27 is now also actuated, and a clear position of the rotary latch position can be detected. In the fully open position of the rotary latch 3, the pawl 4 is also kept out of engagement with the pawl rotary latch 3 by means of the transmission lever 11, the contour 33 of the transmission lever 11 coming into engagement with a latching surface 34 on the plastic cladding 21 of the pawl 4. For this purpose, the transmission lever 11 is spring-preloaded against the rotary latch 3 by means of a spring element 35. When the rotary latch 3 is closed, the rotary latch 3 moves the transmission lever 11 out of engagement with the latching contour 34 again, such that the pawl 4 can again enter the rotary latch 3. The actuation of the microswitches 25, 26, 27 then takes place in the reverse order, such that the latching positions, pre-latching or support position and main latch can again be detected and can be forwarded via the electrical component carrier 8 and the plug element 30 to a higher-level controller 36. When the pre-latching position is reached in the closing process, the closing drive 7 can then be actuated and the rotary latch 3 can be transferred from the support position or pre-latching position into the main latching position.

By means of the microswitches 25, 26, 27 and the interaction between the control lever 9, the release lever 10 and the rotationally movable mounting of the control lever 9 and the release lever 10, a clear assignment of the position of the locking mechanism 2 can be detected and a secure closing and opening of the hood lock 1 can thus be realized.

LIST OF REFERENCE SIGNS

- 1 hood lock
- 2 locking mechanism
- 3 rotary latch
- 4 pawl
- 5 lock holder
- 6 lock case
- 7 closing drive
- 8 electrical component carrier
- 9 control lever
- 10 release lever
- 11 transmission lever
- 12 positioner
- 13, 15, 35 spring element
- 14 main latch
- 16, 33 contour
- 17 guide
- 18, 40 guide bolt
- 19, 42, 28 shaft
- 20 drive element
- 21 extension
- 22 closing lever
- 23 drive lever
- 24 Bowden cable
- 25, 26, 27 microswitch
- 29 conductor track
- 30 plug
- 31,32 control contour
- 10 34 latching surface
- 36 controller
- P, P1 arrow

The invention claimed is:

1. A hood lock for a motor vehicle, the hood lock comprising:

a locking mechanism having a rotary latch and a pawl, a lock holder interacting with the locking mechanism, a release lever, wherein the rotary latch in a main latching position and a pre-latching position, is unlocked by the release lever, wherein the rotary latch is transferred from the main latching position into the pre-latching position after a first actuation of the release lever, and the rotary latch is moved into a release position from the pre-latching position after a second actuation of the release lever, a closing drive, wherein the rotary latch is moved by the closing drive from the pre-latching position into the main latching position, a control lever, wherein the control lever directly engages the rotary latch and is biased to move as a result of the rotary latch moving from the main latching position to the release position, a first switch, wherein at least one position of the rotary latch is detected by the first switch via detecting a position of the control lever, and a second switch that is only actuated when the pawl is in a pawl pre-latching position corresponding to the pre-latching position of the rotary latch, wherein the first switch and the second switch are unactuated in the main latching position of the rotary latch corresponding to a pawl main latching position, and wherein the second switch is unactuated when the pawl is in a pawl open position, wherein the pawl is actuated electrically via the release lever, and wherein the pawl pre-latching position is determined via detecting a position of the release level when the release lever actuates the second switch.

2. The hood lock according to claim 1, wherein the control lever directly engages a contour on the rotary latch.

3. The hood lock according to claim 2, further comprising a third switch, wherein the control lever engages at least one of the first switch and the third switch as the rotary latch moves between the release position and the main latching position.

4. The hood lock according to claim 2, wherein the contour is on a bolt of the rotary latch.

5. The hood lock according to claim 2, further comprising a closing lever, wherein the contour on the rotary latch is brought into engagement with the closing lever.

6. The hood lock according to claim 5, further comprising a spring element, wherein in the main latching position of the rotary latch, the control lever is preloaded by the spring element to the contour on the rotary latch.

7. The hood lock according to claim 1, further comprising a closing lever and a reinforcement plate that supports the locking mechanism, wherein the closing lever is guided by the reinforcement plate.

8. The hood lock according to claim 1, wherein the release lever and the control lever are pivotably accommodated on an electrical component carrier.

9. The hood lock according to claim 1, further comprising a transmission lever, wherein the transmission lever is in contact with the rotary latch in the main latching position and engages with the pawl when the rotary latch is released to the release position to position the pawl when the rotary latch is in the release position.

10. The hood lock according to claim 1, further comprising a positioner and a tension spring that provides a force on the lock holder in an opening direction.

11. The hood lock according to claim 1, further comprising a closing lever, wherein the closing drive includes an electromotive drive and a drive lever that acts on the closing lever.

12. The hood lock according to claim 1, further comprising a third switch that is actuated by the control lever.

13. The hood lock according to claim 1, wherein the first switch is actuated when the rotary latch is in the pre-latching position.

14. The hood lock according to claim 1, further comprising a third switch actuated by the control lever, wherein the third switch is actuated when the rotary latch is in the release position.

15. A hood lock for a motor vehicle, the hood lock comprising:

a locking mechanism having a rotary latch and a pawl, a lock holder interacting with the locking mechanism, a release lever, wherein the rotary latch in a main latching position and a pre-latching position, is unlocked by the release lever, wherein the rotary latch is transferred from the main latching position into the pre-latching position after a first actuation of the release lever, and the rotary latch is moved into a release position from the pre-latching position after a second actuation of the release lever, a closing drive, wherein the rotary latch is moved by the closing drive from the pre-latching position into the main latching position, a control lever, wherein the control lever directly engages the rotary latch and is biased to move as a result of the rotary latch moving from the main latching position to the release position, a first switch, wherein at least one position of the rotary latch is detected by the first switch via detecting a position of the control lever, and a second switch that is only actuated when the pawl is in a pawl pre-latching position corresponding to the pre-latching position of the rotary latch, wherein the first switch and the second switch are unactuated in the main latching position of the rotary latch corresponding to a pawl main latching position, wherein the second switch is unactuated when the pawl is in a pawl open position, and wherein the first switch is actuated when the rotary latch is in the pre-latching position.

* * * * *